United States Patent [19]

Drlik

[11] Patent Number: 4,747,183
[45] Date of Patent: * May 31, 1988

[54] TEMPLE BIASING EYEGLASS SPRING HINGE

[75] Inventor: Günther Drlik, Pforzheim, Fed. Rep. of Germany

[73] Assignee: OBE-Werk Ohnmacht & Baumgartner GmbH & Co. KG, Ispringen, Fed. Rep. of Germany

[*] Notice: The portion of the term of this patent subsequent to Jul. 24, 2001 has been disclaimed.

[21] Appl. No.: 945,229

[22] Filed: Dec. 29, 1986

Related U.S. Application Data

[63] Continuation of Ser. No. 701,733, Feb. 14, 1985, abandoned.

[30] Foreign Application Priority Data

Jun. 30, 1984 [DE] Fed. Rep. of Germany ....... 3424263

[51] Int. Cl.$^4$ ............................................... G02C 5/22
[52] U.S. Cl. ........................................ 16/228; 16/301; 351/113
[58] Field of Search ................. 16/228, 286, 301, 304, 16/386; 351/113, 153

[56] References Cited

U.S. PATENT DOCUMENTS

| 2,874,609 | 2/1959 | Ducati | 16/228 X |
| 3,034,402 | 5/1962 | Alberetti | 16/228 X |
| 4,005,930 | 2/1977 | Guenin | 351/113 |
| 4,222,148 | 9/1980 | Zellweger et al. | 16/228 |
| 4,351,086 | 9/1982 | Drlik | 16/228 |
| 4,461,548 | 7/1984 | Drlik | 351/153 |

FOREIGN PATENT DOCUMENTS

| 3928 | 9/1979 | European Pat. Off. | 351/113 |
| 1124727 | 8/1932 | Fed. Rep. of Germany . | |
| 1235623 | 6/1964 | Fed. Rep. of Germany . | |
| 2948113 | 6/1981 | Fed. Rep. of Germany | 351/153 |
| 2418477 | 9/1979 | France . | |
| 2521310 | 8/1983 | France | 351/113 |

Primary Examiner—Fred Silverberg
Attorney, Agent, or Firm—Balogh, Osann, Kramer, Dvorak, Genova & Traub

[57] ABSTRACT

A spring hinge for eyeglasses in which each bow can be swung out against spring force about a fulcrum spaced from the hinge axis so that the bow will resiliently bear on the temples of the wearer. A spring is secured on a plunger rod between a plunger head at one end of the rod and a stop ring, which is slidably mounted on the rod. The plunger is contained in and releasably locked to a receptacle which is provided on the bow. The plunger rod is connected to a bow-side bearing eye. Owing to that arrangement, the bow-side hinge member and the parts connected to it can be assembled and taken apart by access to only one end of the receptacle.

7 Claims, 2 Drawing Sheets

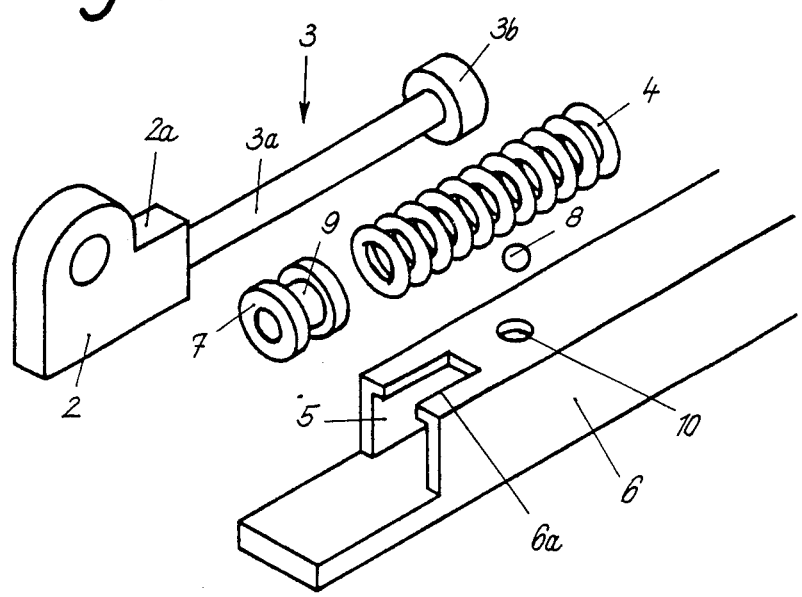
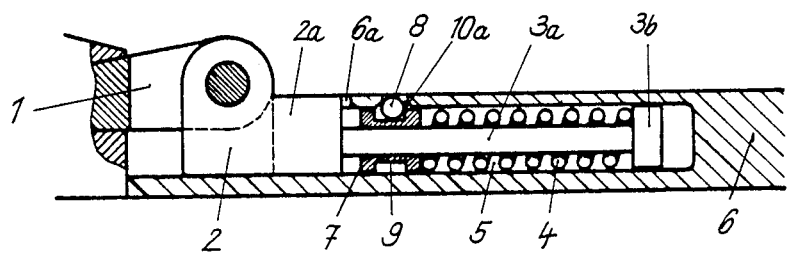

TEMPLE BIASING EYEGLASS SPRING HINGE

This is a continuation of application Ser. No. 701,733, filed Feb. 14, 1985 and now abandoned.

BACKGROUND OF THE INVENTION

1. Field of the Invention

This invention relates to a spring hinge for eyeglasses in which each bow can be swung out against spring force about a fulcrum spaced from the hinge axis so that the bow will resiliently bear on the head of the wearer.

2. Description of the Prior Art

A spring hinge for use in such eyeglasses is known, e.g., from German Patent specification No. 11 24 727 and comprises a bow-side hinge member to be connected to a bow, a rim-side hinge member to be connected to the rim of the eyeglasses, and a hinge pin pivotally connecting said hinge members. The bow-side hinge member is connected to a spring-loaded plunger, which is slidably mounted in a receptacle and is adapted to be pulled out of the receptacle against the force of a coil spring, which tends to retract the plunger and is slidably fitted on a rod of the plunger, and the spring bears at one end on a head of the plunger. To assemble that spring hinge as well as the spring hinge disclosed in French Patent specification No. 78 07 553, access to opposite ends of the receptacle is required and in the known spring hinges the second abutment for the spring is constituted by a shoulder formed in said receptacle. That assembly and design are expensive and require a special shape and a relatively large bulk of the receptacle, which is connected to the bow.

Other spring hinges, such as the one disclosed in German Patent specification No. 12 35 623, comprise a spring-loaded pin, which extends at right angles to the longitudinal axis of the bow and are highly expensive and cannot be used with the thin, metal frames which are often used now and comprise also thin metal bows.

SUMMARY OF THE INVENTION

It is an object of the invention to provide a spring hinge which can be assembled and taken apart by access to only one end of the receptacle and which requires only a small space and nevertheless ensures a satisfactory control of the bow, as is required in comfort eyeglasses.

In a spring hinge for eyeglasses in which each bow can be swung out against spring force about a fulcrum spaced from the hinge axis so that the bow will resiliently bear on the head of the wearer, which spring hinge comprises a bow-side hinge member to be connected to a bow, a rim-side hinge member to be connected to the rim of the eyeglasses, and a hinge pin pivotally connecting the hinge members, wherein the bow-side hinge member is connected to a spring-loaded plunger, which is slidably mounted in a receptacle and is adapted to be pulled out of said receptacle against the force of a coil spring, which tends to retract the plunger and is slidably fitted on a rod of the plunger, and the spring bears at one end on a head of the plunger, this object is accomplished in that an abutment for the other end of the spring consists of a stop member, which is slidably mounted on the plunger rod and is locked in the receptacle. The means for locking the stop member in the receptacle comprise a recess formed in the stop member and a locking member which extends into the recess and under the action of the spring cooperates with a hole in a wall of the receptacle.

In accordance with another feature of the invention the spring force urging the bow against the weaver's head is adjustable because the bearing eye of the bow-side hinge member is slidably mounted on the plunger rod and the latter is screwed near one end into the plunger head and at the other end has a screw head for adjusting the pressure of the spring by a rotation of the rod. The plunger is slidably movable in the receptacle and held against rotation therein.

To produce a snap action as the bow is opened and closed, the rim-side hinge member may have two bearing eyes provided with cams, the spring-loaded bow-side hinge member may have a bow-side bearing eye extending between the rim-side bearing eyes, and the receptacle may have an end portion formed with cheeks which are engageable by the cams under the action of the spring. The hinge pin connecting the rim-side and bow side bearing eyes may have an annular recess, which extends through the bow-side bearing eye so that the hinge pin is a snap-in pin held by spring action and need not be held by screw threads.

BRIEF DESCRIPTION OF THE DRAWING

FIG. 1 is an exploded view showing the components of a first embodiment of the spring hinge.

FIG. 2 is a central sectional view showing the spring hinge of FIG. 1.

DETAILED DESCRIPTION OF THE PREFERRED EMBODIMENTS

Figure 3:
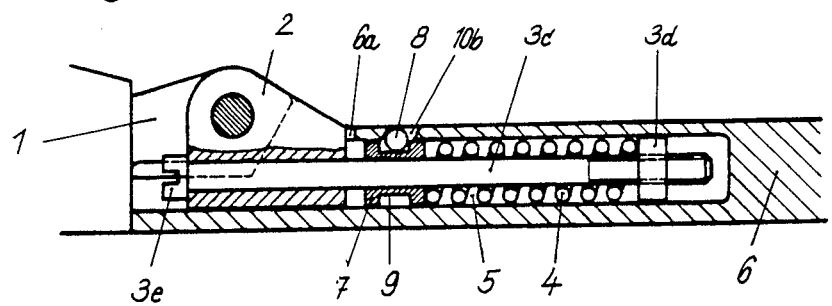
FIG. 3 is a central sectional view showing a second embodiment of the spring hinge.

Preferred embodiment of spring hinges in accordance with the invention will now be described more in detail with reference to the drawing.

It is apparent from FIGS. 1 and 2 that the spring hinge comprises a rim-side hinge member 1 and a bow-side hinge member 2, 2a. The latter is connected to a spring-loaded plunger 3, which extends into a receptacle 5 provided at the end portion 6 of a bow. That receptacle contains a coil spring 4, which tends to retract the plunger 3 into the receptacle 5. The coil spring 4 is slidably fitted on a rod 3a of the plunger 3. The spring 4 bears at one end on the plunger head 3b and bears at the other end on an abutment, which is constituted by a stop member 7, which is slidably mounted on the plunger rod 3a and is detachably locked in the receptacle 5 e.g., by means of a latching ball 8.

The end portion of the bow is formed with a longitudinally extending blind bore, which occupies a substantial portion of the inner space thereof and defines the walls of the receptacle 5. The walls of the receptacle 5, which constitute also the walls of the end portion of the bow, are relatively thin or narrow as compared with the width of the blind bore or receptacle. These walls are formed on one side with an open-ended longitudinal slot 6a and with a hole 10, which has an inwardly end portion 10a opening into the blind bore.

The bow-side hinge member comprises a flat bow-side bearing eye 2 and a keying portion 2a, which is rigid with the plunger rod 3a, on which the coil spring 4 and the stop member 7 are slidably mounted. The arrangement is such that the spring 4 is under initial stress to urge the stop member 7 against the keying portion 2a. To mount the bow-side hinge member on the end portion 6 of the bow, the plunger head 3b is inserted into the receptacle 5 until the keying portion 2a extends in the slot 6a and an annular groove 9 formed in the outside peripheral surface of the stop member 7 registers with the hole 10. Now a ball 8 is inserted into the annular groove 9 through the hole 10 so that the stop member 7 biased by the spring 4 is releasably latched by the ball.

The keying portion 2a is held in the slot 6a against rotation about the axis of the rod 3a.

The plunger rod 3a may be integral with the plunger head 3b or with the keying portion 2a. In the latter case the plunger head 3b will be secured to the plunger rod 3a, e.g., by screw threads or lock beads, when the stop member 7 and the coil spring 4 have been slidably mounted on the plunger rod 3a. If the plunger head 3b is integral with the plunger rod 3a, the latter may similarly be connected to the keying portion 2a. It has been explained hereinbefore that the receptacle 5 may be provided in that the bow is formed in its end portion 6 with a blind bore. That end portion may have been deformed to have a larger thickness. It is apparent that the present spring hinge can be assembled by access to only one end of the receptacle and is highly suitble for eyeglasses having thin metal frames or plastic frames. In the latter case the receptacle may be a metal element embedded in the end portion of the bow.

In the embodiment shown in FIG. 3 the elements 1, 2 and 4 to 10 are the same as in the embodiment described hereinbefore but the plunger rod 3c is screwed to the plunger head and extends through the bow-side hinge member and at the end which is opposite to the plunger head has a screw head 3e for adjusting the initial stress of the spring 4 by rotating the plunger rod 3c axially slidably mounted and held against rotation in the receptacle 5. For this purpose the inside surface of the receptacle 5 may be non-circular, e.g., rectangular in cross-section and the plunger head 3d may have a corresponding cross-sectional shape. Alternatively the receptacle 5 may define a circular blind bore and in that case the plunger head may be held against rotation in the receptacle 5 by a longitudinal tongue-and-groove joint. The stop member 7 is locked to the receptacle by means which are similar to those shown in FIGS. 1 and 2 with the difference that the latching ball 8 is held in the wall of the receptacle in an inclined hole 10b, which extends radially inwardly and toward the bow-side hinge eye 2.

Figure 4:
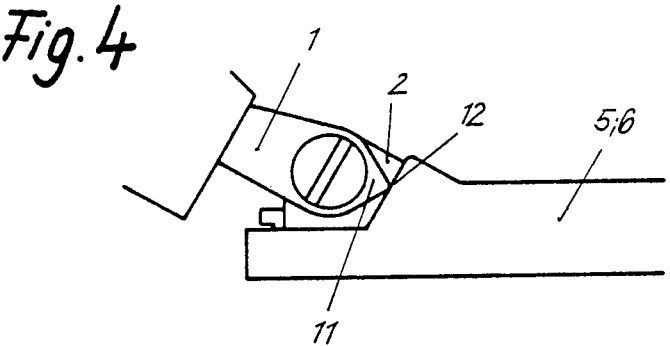
FIG. 4 is an elevation showing a snap-action spring hinge.

In FIG. 4 it is shown that each rim-side bearing eye 1 is provided at its periphery with a cam 11, which under the action of the spring 4 is urged against an associated cheek 12 formed on the adjacent end portion of the receptacle 5. That arrangement will result in a snap action as the bow is moved between its open and closed positions.

Figure 5:
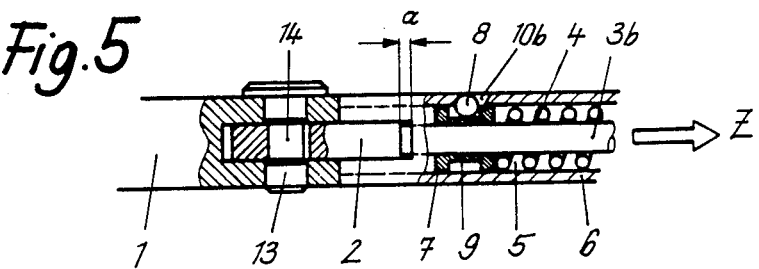
FIG. 5 is a longitudinal sectional view showing a spring hinge having a snap-in hinge pin.

FIG. 5 shows a hinge having a snap-in hinge pin 13. That hinge pin 13 has an intermediate peripheral recess 14, which extends through the bow-side bearing eye 12 so that the hinge pin 13 is held in the bearing eyes merely by the action of the spring 4 without a need for a screw-threaded joint. This is ensured in that an axial clearance designated "a" in FIG. 5 is maintained between the bow-side bearing eye 2 and the receptacle in all angular positions of the bow.

What is claimed is:
1. In a spring hinge for eyeglasses, comprising:
   a rim-side hinge member comprising rim-side bearing eye means,
   a bow-side hinge member comprising bow-side bearing eye means pivotally connected to said rim-side bearing eye means,
   a receptacle,
   a plunger rod connected to said bow-side hinge member and extending into said receptacle,
   a plunger head mounted on said plunger rod slidably mounted in said receptacle,
   a compression spring slidably mounted on said plunger rod and bearing at one end on said plunger head, and
   a stop contained in and axially fixed to said receptacle and engaging the other end of said spring, which is under initial stress,
   the improvement comprising:
   said receptacle is constituted by an end portion of a bow, said end portion is formed with an axial blind bore occupying a substantial portion of said end portion inner space and defining the walls of said receptacle, said walls constitute walls of said end portion of the bow, said walls being thin or narrow relative to the width of the bow,
   said stop is constituted by a separate stop member, which is slidably mounted on said plunger rod and positively connected to said receptacle,
   said walls being formed on one side with an open-ended longitudinal slot,
   said bow-side hinge member having a key portion slidably positioned in said slot, and
   quick release locking means are provided which positively connect said stop member to said receptacle under the action of said spring, said stop member being provided with an annular recess, said receptacle having one open end facing said bow-side hinge member, and said receptacle being adapted to receive said plunger head and said stop member through said one open end, whereby said spring hinge can be assembled or taken apart by access to only said one open end of said receptacle.

2. The improvement set forth in claim 1, wherein said locking means is detachably connected to said receptacle.

3. The improvement set forth in claim 1, wherein said receptacle comprises a side wall formed with a hole adjacent to said stop member, and said locking means extending in said hole and in said recess.

4. The improvement set forth in claim 3, wherein said locking means consists of a ball.

5. The improvement set forth in claim 4, wherein said hole has an inclined surface and said stop member is positively connected to said receptacle by said ball under the action of said spring.

6. The improvement set forth in claim 5, wherein said hole has an inwardly flaring radially inner end portion.

7. The improvement set forth in claim 5, wherein said hole is inclined to extend radially inwardly and toward said bow-side hinge member.

* * * * *